United States Patent [19]

Kibblehouse et al.

[11] Patent Number: 5,456,842
[45] Date of Patent: Oct. 10, 1995

[54] METHOD FOR RECYCLING CLEANING FLUID

[75] Inventors: Harry Kibblehouse, Fountain Inn, S.C.; Michael Presley, Novi, Mich.; Jared Finney, Troy, Mich.; Harvey Grace, Bloomfield Hills, Mich.

[73] Assignee: Separation Dynamics International, Ltd., Farmington Hills, Mich.

[21] Appl. No.: 210,353

[22] Filed: Mar. 18, 1994

[51] Int. Cl.[6] ................................................. B01D 61/00
[52] U.S. Cl. .................. 210/649; 210/651; 210/653; 210/655; 210/195.2; 210/257.2; 210/641; 210/500.23; 210/805; 134/10; 134/40
[58] Field of Search .................................. 210/634, 653, 210/650, 651, 641, 195.2, 257.2, 500.23, 500.29, 645, 805, 644, 649, 655; 96/6; 134/10, 29, 40

[56] References Cited

U.S. PATENT DOCUMENTS

| | | | |
|---|---|---|---|
| 4,846,976 | 7/1989 | Ford | 210/195.2 |
| 4,857,081 | 8/1989 | Taylor | 210/645 |
| 4,886,603 | 12/1989 | Taylor | 210/641 |
| 4,976,869 | 12/1990 | Taylor | 210/644 |
| 5,043,072 | 8/1991 | Hitutsuyamagi et al. | 210/651 |
| 5,076,932 | 12/1991 | Taylor | 210/640 |
| 5,158,681 | 10/1992 | Freeman et al. | 210/641 |
| 5,271,842 | 12/1993 | Degen et al. | 210/634 |

FOREIGN PATENT DOCUMENTS 9115286  10/1991  WIPO .................... 210/651

*Primary Examiner*—Robert A. Dawson
*Assistant Examiner*—Ana M. Fortuna
*Attorney, Agent, or Firm*—Reising, Ethington, Barnard and Perry

[57] ABSTRACT

A method and apparatus for recycling water based workpart cleaning fluid of the type used to wash workparts (B) free of soils, such as emulsified and non-emulsified cutting oils and lubricants, particulate matter and other hydrophobic fluids. A parts washer (12) is provided for cleaning workparts (B) contaminated with soils. The contaminated cleaning fluid is discharged from the parts washer (12) in a slip stream and directed to a process tank (22). The contaminated cleaning fluid is pumped from the process tank (22) to a prefilter (28) where large particles are screened. The cleaning fluid is then directed to regenerated cellulose membrane filters (34) where the water based cleaning fluid and the hydrophilic water soluble substances in the base, i.e., the detergents, are imbibed through the membrane (34) as permeate while the soils pass as retentate. The permeate is returned to the parts washer (12), whereas the retentate is directed back to the process tank (22).

17 Claims, 2 Drawing Sheets

METHOD FOR RECYCLING CLEANING FLUID

TECHNICAL FIELD

The subject invention relates to a process and apparatus for removing organic compounds from a water based cleaning fluid. More particularly, the present invention relates to a method for recycling workpart cleaning fluid of the type used to wash workparts free of emulsified cutting oils and other soils.

BACKGROUND ART

Cutting fluids are used in many metal cutting operations, as well as in grinding, to maintain optimum production rates, minimize tool wear, and improve surface finish, etc. One of the primary types of cutting fluids comprises emulsified oils which provide excellent cooling and lubrication for metal cutting at high speeds due to their high specific heat, high thermal conductivity, and high heat of vaporization. These cutting oils, as well as other oils from the metal working and handling machinery, remain on the workpart after manufacture and must be removed prior to use or sale of the workpart.

Various types of cleaning apparatus have been proposed in the prior art, such as dunk tanks and spray booths, all generally referred to as parts washers. In a parts washer, the cleaning fluid is used to wash the workpart free from surface born soils, such as oils and other hydrophobic, hydrocarbon fluids, as well as particulates. This cleaning fluid typically comprises a water base with various hydrophilic water soluble additives such as soaps, surfactants, defoamers and rust inhibitors, etc. These additives to the water base constitute the expensive ingredients, as well as those ingredients which are least readily degradable in the environment.

According to the prior art, as the oil and other hydrophobic fluids emulsified in the cleaning fluid become increasingly concentrated in the cleaning fluid, the cleaning fluid becomes less effective and is eventually discarded. Discarding dirty cleaning fluid is expensive due to the high cost of the cleaning additives, and also raises concerns of discharging the old oil and cleaning fluid into the environment. In some instances, special disposal arrangements are required for the old, used cleaning fluid.

SUMMARY OF THE INVENTION AND ADVANTAGES

The subject invention contemplates a method for separating soils of emulsified and nonemulsified hydrophobic fluids out of a water based cleaning fluid. The method comprises the steps of providing a cleaning fluid consisting essentially of water and soap molecules in solution, mixing the cleaning fluid with hydrophobic fluids and directing the mixture into contact with a nonporous membrane. The improvement of the subject invention comprises the step of imbibing at least a portion of the cleaning fluid through the nonporous membrane while repelling the hydrophobic fluids as the cleaning fluid is imbibed through the nonporous membrane.

The subject invention also includes a filtration system for separating emulsified and non-emulsified hydrophobic fluids and particulate out of a water based cleaning fluid. The system comprises a parts washer containing the cleaning fluid consisting essentially of water and soap molecules mixed with hydrophobic fluids, and a circulation hose connected at an upstream washer outlet end to the parts washer and also at a downstream washer inlet end. A pump circulates the mixture through the hose as a slipstream. The improvement comprises a nonporous membrane positioned along the hose for imbibing at least a portion of the cleaning fluid through the nonporous membrane for return to the parts washer while repelling the hydrophobic fluids as the cleaning fluid is imbibed through the nonporous membrane.

The subject invention effectively strips the contaminated cleaning fluid free of emulsified and non-emulsified oils and other hydrophobic particles and soils while leaving the water and expensive water soluble additives in solution for recycling. Thus, the water base and detergent of the cleaning fluid may be reused many times. This not only reduces the expense of operating a parts washer, but also meets environmental concerns by reducing chemical waste and oily waste.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
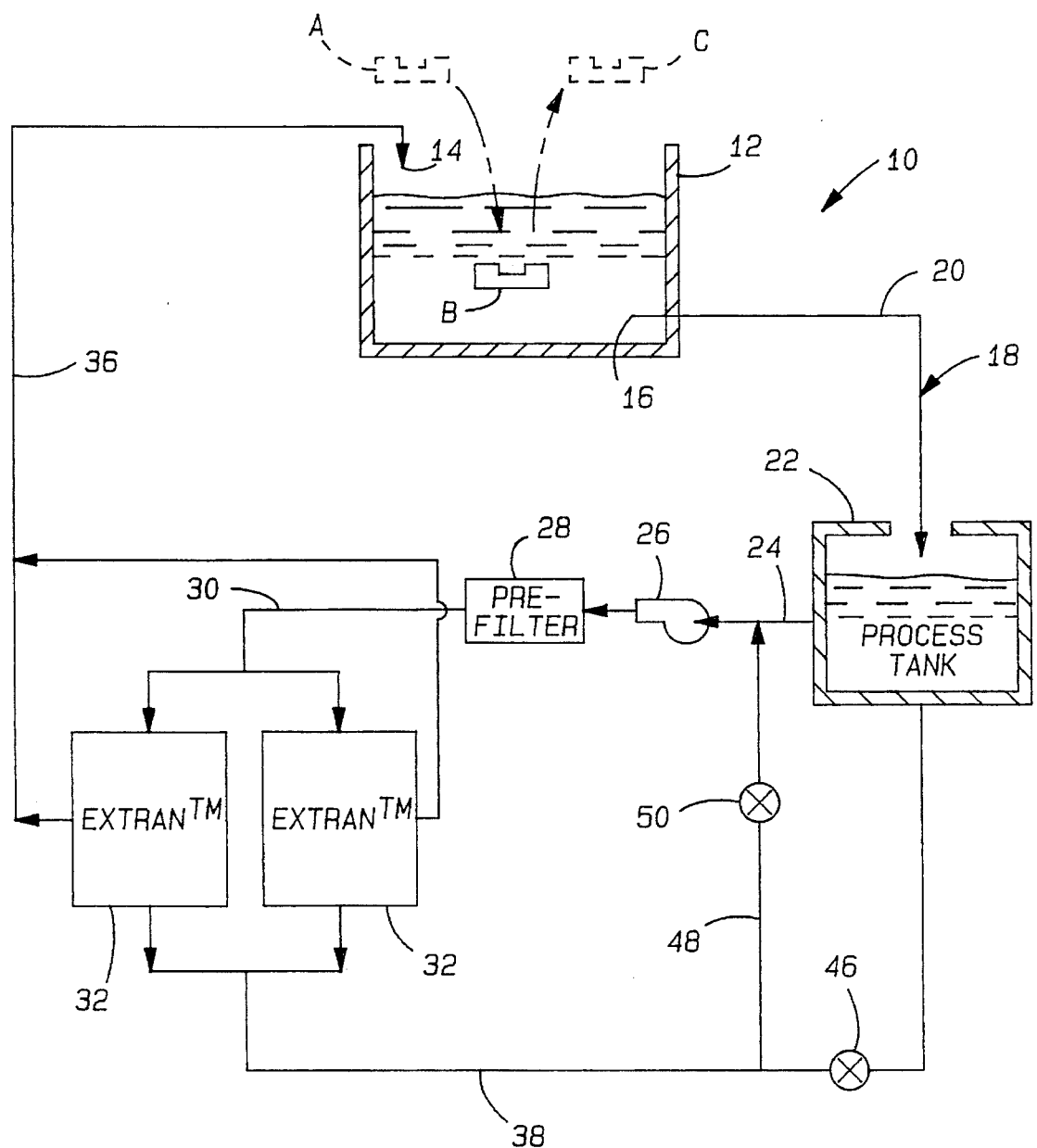
FIG. 1 is a schematic representation of the filtration system construction in accordance with the present invention.

Referring to the Figures, wherein like numerals indicate like or corresponding parts throughout the several views, a schematic representation of the filtration system of the subject invention is generally shown at 10 in FIG. 1. In the metal working industry, parts are often lubricated in various oils and coolants while they are manufactured. Oils found in such coolants are produced by Eppert Oil Co. as Star Kut 150 Bravo, although others known in the art can be used. These fluids, as well as other oils and particulate from the manufacturing machinery, remain on the workpart after manufacture. Often, the parts must be cleaned of these soils prior to use and sale. Due to tightening environmental regulations, water based cleaners are used almost predominantly in industry today. These water based cleaners include a water base consisting essentially of water with various additives such as soaps, surfactants and defoamers. Soaps including defoamers and rust inhibitors found in such cleaning fluids are produced by Producto Chemical as SP2238, and surfactants found in such cleaning fluids are produced by Barrington Chemicals as SIPA 31, although others known in the art can be used. The soaps and other additives are expensive ingredients which are reclaimed along with the water by way of the subject filtration system 10.

In FIG. 1, a workpart soiled with oil and other hydrophobic fluids is shown in phantom at A. The same workpart undergoing a cleaning operation to remove the soils is shown at B, and a fully cleaned workpart is shown in phantom at C. A parts washer 12 containing the cleaning fluid receives the workpart B during the cleaning operation.

Although in FIG. 1 the parts washer 12 is depicted as a tank-type immersion container, it will be readily appreciated by those skilled in the art that other parts washing systems known in the art would be equally applicable. Thus, the parts washer 12 shown in FIG. 1 contains the cleaning fluid which consists essentially of water and soap, surfactant and defoamer molecules. The oils and other hydrophobic fluids and particles or molecules attached to the workpart B are removed from the workpart B and become emulsified with the water and soap (and other additives) molecules in the cleaning fluid. More particularly, the oil and other hydrophobic fluid molecules are associated with the "hydrophobic tails" of the soap molecules under a relatively slight force of attraction, i.e. van der Walls' forces. This association forms the emulsion of water cleaning fluid and oil.

The parts washer 12 includes a cleaning fluid inlet 14 and a cleaning fluid outlet 16. A circulation hose, generally indicated at 18, is connected between the outlet 16 and the inlet 14 of the parts washer 12 to circulate a slip stream of cleaning fluid contaminated with the hydrophobic fluids, i.e., the emulsion, from the parts washer 12 and return noncontaminated cleaning fluid back to the parts washer 12. The circulation hose 18 includes a discharge segment 20 extending between the outlet 16 and a process tank 22. The process tank 22 is a nonpressurized container which performs numerous functions, one of which is to collect the concentrated hydrophobic fluids for easy removal when the concentration of oil or other hydrophobic fluids in the cleaning fluid increases.

The circulation hose 18 further includes a pump segment 24 which directs the cleaning fluid and oil emulsion away from the process tank 22. A pump 26 is positioned along the pump segment 24. The pump 26 pressurizes the emulsion and directs it via the pump segment 24 to a prefilter 28. The prefilter 28 is of the well known porous type for gleaning large particulate, e.g., larger than 25 microns, from the emulsion. The screened emulsion emanates from the prefilter 28 via a filtration segment 30.

The filtration segment 30 splits at its down stream end and directs the emulsion equally into a pair of membrane modules 32. Within each module 32 is contained a nonporous membrane 34, shown in FIGS. 2 and 3, for imbibing at least a portion of the cleaning fluid while repelling the oil and other hydrophobic fluids and particles with a force greater than the force of attraction (van der Walls' force) between the hydrophobic particles and the soap molecules to release the soils from the cleaning fluid as the cleaning fluid is imbibed through the nonporous membrane 34. Thus, the contaminated emulsion enters the modules 32 via the filtration segment 30, with substantially pure cleaning fluid exiting the modules 32 via a permeate segment 36 while the oil and other hydrophobic particles along with some remaining cleaning fluid exit the canister 32 via a retentate segment 38. The permeate segment 36 leads directly to the inlet 14 of the parts washer 12 thus returning useable cleaning fluid consisting essentially of water and the hydrophilic water soluble additives back to the parts washer 12.

Figures 2, 3:
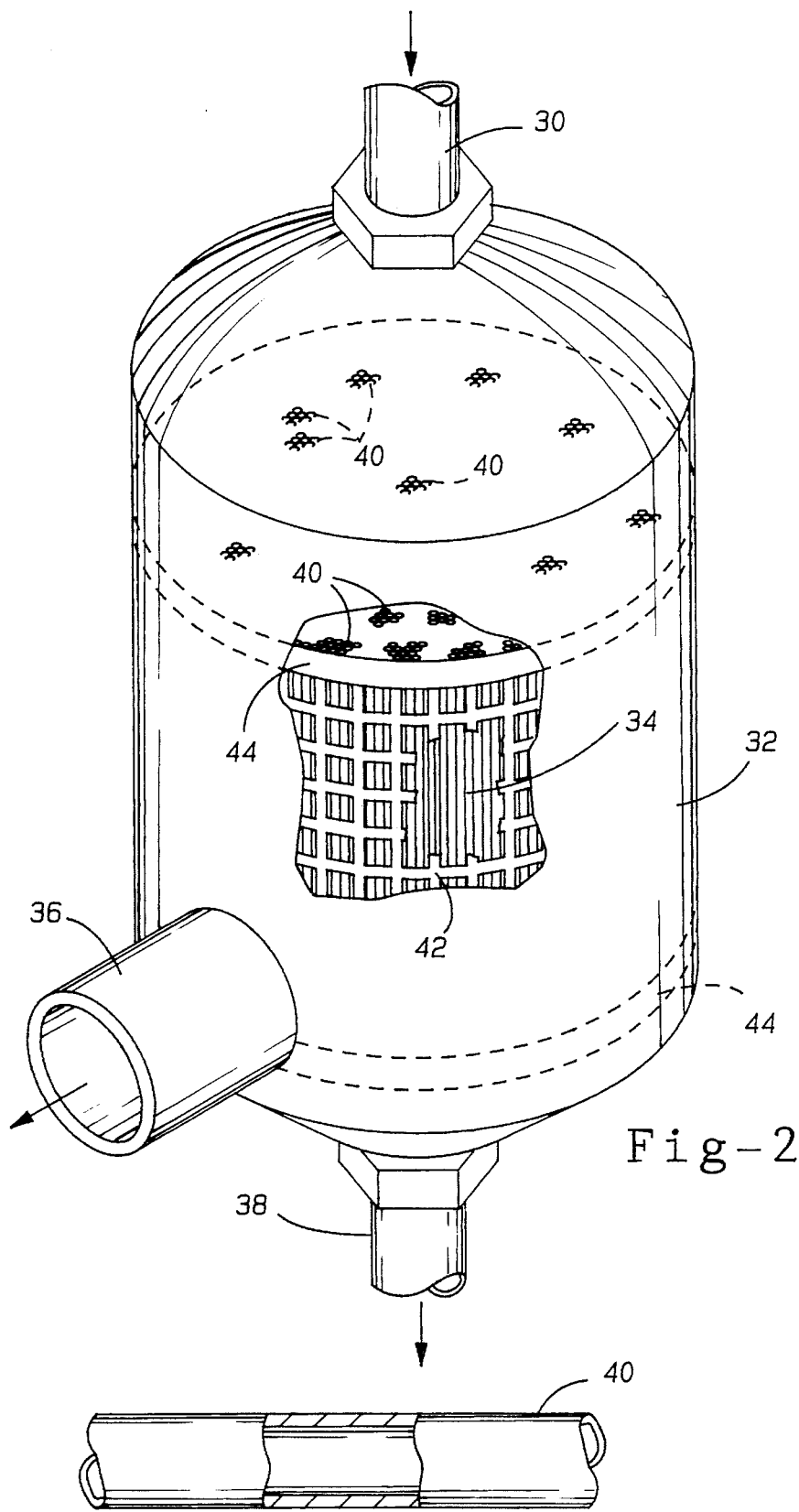
FIG. 2 is a perspective view of a nonporous separation module partly broken away and made in accordance with the present invention.
FIG. 3 is a fragmentary view partially broken away of a hollow fiber membrane.

Referring now to FIGS. 2 and 3, the nonporous membrane in the modules 32 preferably comprises a bundled plurality of elongated hollow fibers 40 held in a web-like polyurethane netting 42 or a polyurethane foam. The netting 42 is required only for convenient bundling of the fibers 40 during placement in the modules 32. Accordingly, those skilled in the art may appreciate other configurations or arrangements to be more expedient. The ends of the fibers 40 are embedded in a potting material 44 adjacent the filtration segment inlet to the modules 32 and the retentate segment 38 outlet from the modules 32, while their hollow openings remain free to fluid flow therethrough. Preferably, the hollow fibers 40 are manufactured from a cuprammonium regenerated cellulose material. Nonporous membranes 34 of this type may be had from the assignee of the subject invention under the trade name EXTRAN™. The hollow fibers have an inside diameter of approximately 400 microns. However, it will be readily appreciated by those skilled in the art that other nonporous membranes of the sheet, tube or other form are readily adaptable to the subject invention, so long as they are capable of passing hydrophilic fluids and rejecting hydrophobic fluids. For further technical description of the non-porous filter system of this invention, reference may be had to U.S. Pat. No. 5,076,932, issued Dec. 31, 1991 and U.S. Pat. No. 5,158,681, issued Oct. 27, 1992, both assigned to the assignee of the subject invention, the disclosures of which are hereby incorporated by reference.

Referring again to FIG. 1, the retentate segment 38 carrying the concentrated oil and hydrophobic fluid emulsion with some cleaning fluid is returned to the process tank 22. A valve 46 helps control flow rates of the retentate back to the process tank 22. A bridge segment 48 extends between the retentate segment 38, upstream of the valve 46, and the pump segment 24 upstream of the pump 26. The bridge segment 48 returns fluid to the emulsion, upstream of the pump 26, to increase system efficiency. A bridge valve 50 regulates the flow of retentate through the bridge segment 48.

Thus, the instant method for recycling workpart cleaning fluid used to wash workparts B free of emulsified cutting oils and other hydrophobic fluids includes the steps of directing the cleaning fluid to a parts washer 12. Workparts B are positioned in the parts washer 12 in contact with the cleaning fluid to wash the workpart B free from surface borne soils of hydrophobic fluids and particulate. The cleaning fluid contaminated with the hydrophobic fluids from the parts washer 12 is discharged in a slip stream via circulation hose 18 and directed into contact with nonporous membranes 34. The hydrophobic fluids are then separated from the cleaning fluid by imbibing the water base and the hydrophilic water soluble substances through the nonporous membranes 34 as permeate while passing as retentate the hydrophobic fluids. The permeate is then directed back to the parts washer 12 to wash additional workparts B free from surface borne hydrophobic fluids.

In other words, the subject invention provides a method for separating emulsified hydrophobic fluid and particulate soils out of a water based cleaning fluid by way of providing a cleaning fluid consisting essentially of water and soap molecules in solution, mixing the cleaning fluid with hydrophobic hydrocarbon particles, i.e., oils, to form an emulsion with the hydrophobic particles associated with the soap molecules under a force of attraction, i.e., van der Walls; forces, and directing the emulsion into contact with a nonporous membrane 34. The cleaning fluid, or at least a generous portion thereof is then imbibed through the nonporous membrane 34 while repelling the hydrophobic particles with a force greater than the force of attraction between the hydrophobic particles and the soap molecules to release the hydrophobic particles from the cleaning fluid as the cleaning fluid is imbibed through the nonporous membrane 34.

Before directing the emulsion into contact with nonporous membranes 34, the emulsion is received into a process tank 22 and then prefiltered through a porous filter 28. Also, the emulsion is pressurized with a pump 26 at a location between the process tank 22 and the porous prefilter 28.

After the imbibing step, the hydrophobic fluids and particles released from the cleaning fluid are collected and conducted back to the process tank 22. However, a portion of the hydrophobic particles released from the cleaning fluid are conducted via the bridge segment 48 into the emulsion at a location between the process tank 22 and the pump 26.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method for separating soils of emulsified and nonemulsified hydrophobic fluids out of a water based cleaning fluid, said method comprising the steps of: providing a cleaning fluid consisting essentially of water and soap molecules in solution; mixing the cleaning fluid with hydrophobic fluids; directing the mixture into contact with a nonporous membrane (34); and imbibing and diffusing at least a portion of the cleaning fluid through the nonporous membrane (34) as permeate while repelling the hydrophobic fluids as the cleaning fluid is imbibed and diffused through the nonporous membrane (34).

2. A method as set forth in claim 1 further including emulsifying the hydrophobic fluids with the cleaning fluid to form an emulsion with the hydrophobic fluid molecules associated with the soap molecules under a force of attraction, and releasing the hydrophobic fluid molecules from the soap molecules with a force greater than the force of attraction during said imbibing step.

3. A method as set forth in claim 2 further including prefiltering the emulsion through a porous filter (28) prior to said directing step.

4. A method as set forth in claim 3 further including receiving the emulsion into a process tank (22) prior to said prefiltering step.

5. A method as set forth in claim 4 further including collecting the hydrophobic particles released from the cleaning fluid and conducting at least portion of same to the process tank (22).

6. A method as set forth in claim 5 further including pressurizing the emulsion with a pump (26) at a location between the process tank (22) and the porous filter (28).

7. A method as set forth in claim 6 further including conducting at least a portion of the hydrophobic particles released from the cleaning fluid into the emulsion at a location between the process tank (22) and the pump (26).

8. A method for recycling workpart cleaning fluid used to wash workparts (B) to remove emulsified oils and other hydrophobic fluids, said method comprising the steps of: directing a cleaning fluid having a water base and soap therein to a parts washer (12); positioning workparts (B) in the parts washer (12) and in contact with the cleaning fluid to wash the workparts (B) to remove hydrophobic fluids; discharging the cleaning fluid contaminated with the hydrophobic fluids from the parts washer (12); separating the hydrophobic fluids from the cleaning fluids by imbibing and diffusing the water base and soap as permeate through a nonporous membrane (34) while retaining the hydrophobic fluids; and directing the permeate cleaning fluid to the parts washer (12) to wash additional workparts (B).

9. A filtration system (10) for recycling workpart cleaning fluid used to wash workparts free of emulsified cutting oils and other soils, said filtration system comprising: a parts washer (12) containing cleaning fluid consisting essentially of water and soap molecules mixed with hydrophobic fluids; a circulation hose (18) connected at one end to an outlet (16) from said parts washer (12) and at the other end to an inlet (14) to said parts washer (12); a pump (26) positioned along said circulation hose (18) for circulating the mixture through said circulation hose (18); and a nonporous membrane (34) positioned along said circulation hose (18) for imbibing and diffusing at least a portion of the cleaning fluid therethrough as permeate while repelling the hydrophobic fluids as the cleaning fluid is imbibed and diffused through the nonporous membrane (34).

10. A filtration system as set forth in claim 9 wherein said nonporous membrane (34) comprises a plurality of cuprammonium regenerated cellulose fibers (40).

11. A filtration system set forth in claim 10 wherein said fibers (40) are hollow.

12. A filtration system as set forth in claim 11 further including a process tank (22) positioned along said circulation hose (18) between said parts washer outlet (16) and said pump (26).

13. A filtration system as set forth in claim 12 further including a prefilter (28) disposed along said circulation hose (18) between said pump (26) and said nonporous membrane (34).

14. A filtration system as set forth in claim 13 wherein said circulation hose (18) includes a retentate segment (38) extending from nonporous membrane (34) to said process tank (22).

15. A filtration system as set forth in claim 14 wherein said fibers (40) are bundled in a canister (32).

16. A filtration system as set forth in claim 15 wherein said fibers (40) are imbedded in a potting material (44) within said canister (32).

17. A filtration system as set forth in claim 16 wherein said circulation hose (18) includes a bridge segment (48) for directing fluid from said retentate segment (38) to a pump segment (24) extending between said process tank (22) and said pump (26).

* * * * *